United States Patent [19]
Bradley

[11] 3,973,117
[45] Aug. 3, 1976

[54] ELECTRON-OPTICAL IMAGE TUBES

[76] Inventor: Daniel Joseph Bradley, 73 Lambton Road, Wimbledon, London SW20, England

[22] Filed: July 23, 1973

[21] Appl. No.: 381,616

[30] Foreign Application Priority Data

July 24, 1972 United Kingdom............... 34544/72

[52] U.S. Cl................................. 250/199; 313/381; 315/378; 315/10; 356/215;217;218;213

[51] Int. Cl.[2] ...................... H01J 31/26; H04B 9/00

[58] Field of Search............... 178/DIG. 27, 7.2, 7.6, 178/7.1; 313/65 R, 94, 83 SP, 381, 373; 315/10, 11, 12, 378; 250/333, 397, 398, 199, 207

[56] References Cited

UNITED STATES PATENTS

| | | | |
|---|---|---|---|
| 2,913,610 | 11/1959 | Henderson et al. | 313/381 |
| 3,333,145 | 7/1967 | Nielsen | 313/381 |
| 3,355,616 | 11/1967 | Hecker et al. | 313/94 |
| 3,432,711 | 3/1969 | Clayton | 313/381 |
| 3,448,210 | 6/1969 | Clayton | 178/7.2 |
| 3,555,344 | 1/1971 | Moore | 313/381 |
| 3,720,838 | 3/1973 | Catchpole | 313/381 |
| 3,761,614 | 9/1973 | Bradley | 178/7.2 |
| 3,766,392 | 10/1973 | Nelson et al. | 250/199 |
| 3,814,979 | 6/1974 | Eberhardt | 313/381 |

*Primary Examiner*—John C. Martin
*Attorney, Agent, or Firm*—Young & Thompson

[57] ABSTRACT

An electron-optical image tube is provided which avoids the limitations imposed by photographic and image storage techniques and which enables a direct linear intensity profile of a pulse train to be obtained. The image tube, instead of having a phosphor screen, has a disc with one or more slit apertures therethrough and a photoelectron image is scanned across the aperture or apertures. The time spacing of the light pulses can be adjusted so that the time of the image tube coincides with the fixed aperture or apertures in the disc when a continuous circular scan is used.

2 Claims, 5 Drawing Figures

ELECTRON-OPTICAL IMAGE TUBES

FIELD OF THE INVENTION

This invention relates to electron-optical image tubes for use in providing direct measurement of repetitive luminous events having durations as short as 1 picosecond or less and with a time resolution in the picosecond or sub-picosecond range.

The invention is particularly concerned with image tube streak cameras operating to such requirements and capable of providing direct linear measurement of repetitive ultra-short light pulses, for example from a continuous working mode-locked laser.

DESCRIPTION OF THE PRIOR ART

My U.S. Pat. No. 3,761,614 describes an electron-optical streaking image tube comprising a photocathode for receiving light images of picosecond duration and converting them to photoelectrons, an extraction electrode consisting of a mesh immediately adjacent to the emission side of the photocathode, a source of positive voltage connected to the mesh to maintain the mesh at a constant positive potential with respect to the photocathode to accelerate the photoelectrons away from the photocathode, a screen for receiving the photoelectrons, and deflection electrode means on the path of the photoelectrons between the mesh and the screen for periodically deflecting the photoelectrons normally to their direction of movement after acceleration thereof, the magnitude of the voltage difference between the photocathode and the mesh and the separation of the photocathode and the mesh being such that the photoelectrons are positively accelerated away from the photocathode at such values that a time resolution in the picosecond range is obtainable in the streak image produced at the screen.

It also describes an image tube streak camera comprising such a streaking image tube, a source of ultra-short light pulses, means providing an image of said pulses at the photocathode of the image tube, voltage generating means connected to said deflection electrode means and providing a ramp voltage thereto, means synchronising the ramp voltage with passage of the photoelectrons through the deflection electrode means, and an image intensifier positioned to receive the streak image from the image tube.

One form of streaking image tube described in my aforesaid patent is suitable for use in providing a continuous circular scanning record. With this tube a continuous circular or spiral deflection path is produced on a phosphor screen of the image tube.

However, such tubes which include phosphor screens and camera systems which use photographic and image storage techniques to provide a visible record have disadvantages under certain circumstances. This is mainly due to photographic and image storage limitations, such as grain size, which arise when one is working with a time resolution in the picosecond and sub-picosecond range.

SUMMARY OF THE INVENTION

It is an object of the present invention to provide an electron-optical image tube which does not require the use of photographic and image storage techniques.

It is a further object of the invention to provide an electron-optical image tube system which enables a direct linear intensity profile of the average pulse of a pulse train to be obtained.

In accordance with the present invention there is provided an electron-optical image tube comprising a photocathode for receiving light images and converting them to photoelectrons, an extraction electrode at the emission side of the photocathode, deflection electrode means on the path of the photoelectrons beyond the extraction electrode, means defining an aperture beyond said deflection electrode means on which the photoelectrons are arranged to impinge, control means operable to scan the photoelectron image across the aperture, and recording means on the side of the aperture remote from the electrodes to receive photoelectrons passing through the aperture.

The means defining the aperture may be a plate on the axis of the tube and perpendicular to the axis with one or more slits therethrough disposed along a radius of the tube.

BRIEF DESCRIPTION OF THE DRAWINGS

Reference is now made to the accompanying drawings, in which.

DESCRIPTION OF THE PREFERRED EMBODIMENT

Figure 1:
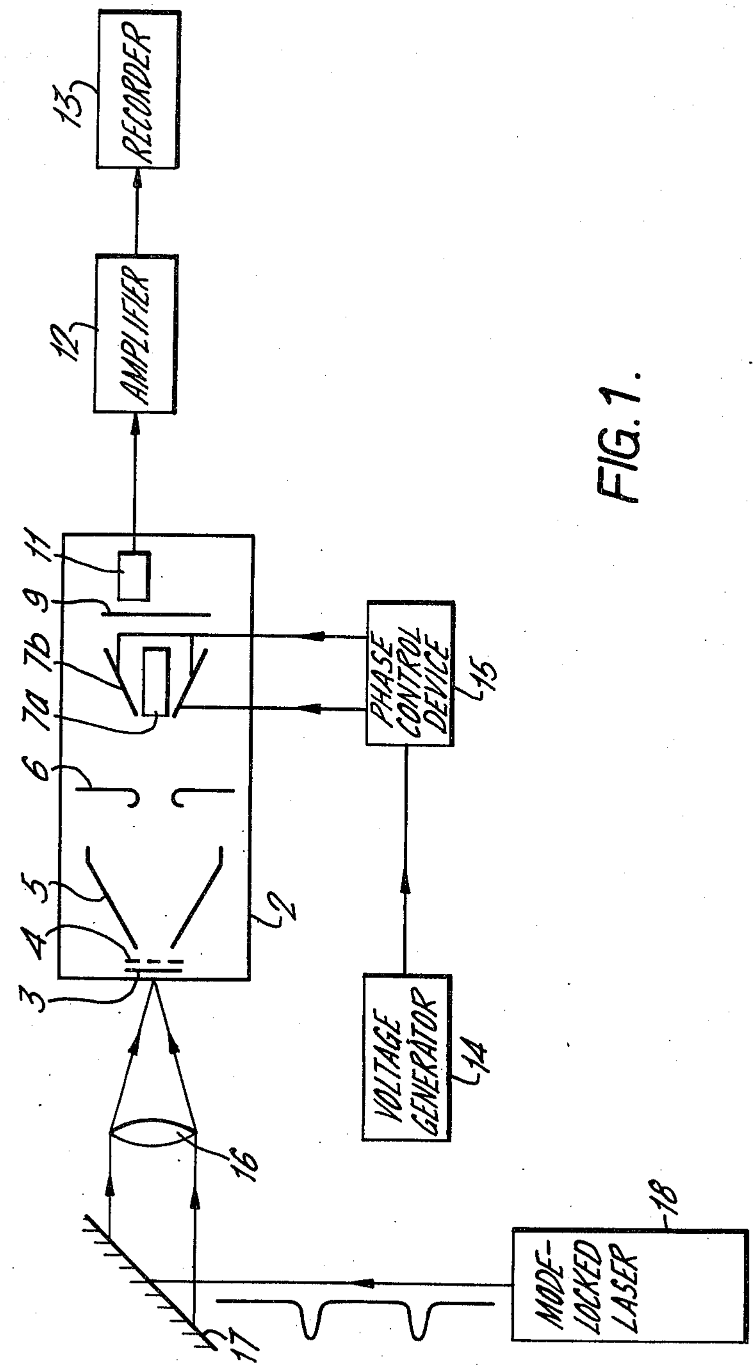
FIG. 1 is a schematic diagram of an image tube apparatus in accordance with the invention.
Figure 3:
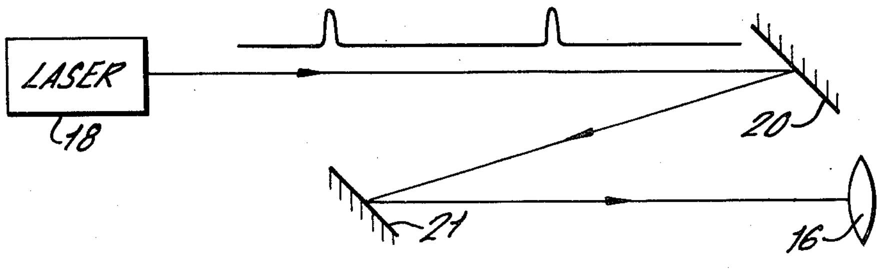
FIG. 3 shows an optical delay line which may be used in the apparatus of FIG. 1.

Referring to FIG. 1 this shows an image tube 2 of the general form shown in FIG. 3 of my aforesaid patent, the disclosure of which is incorporated herein in its entirety by this reference, and to which reference may be made for further details of the tube. It comprises a photocathode 3 upon which light pulses are focussed, an extraction electrode 4 in the form of a mesh immediately adjacent to the emission side of the photocathode, a conical focussing electrode 5, an anode 6, and opposed pairs of deflector electrodes 7*a* and 7*b* which are here shown as plates although strip line electrodes may alternatively be used. A phase control device 15 is connected to the deflector electrodes 7*a*, 7*b* and is also connected to a voltage generator 14 which produces a linear ramp voltage of rapid rise-time, for example of the order of 1 nanosecond or less. The light source for the tube 2 is a pulse train from for example a mode-locked laser 18, and the pulses are reflected at a plate 17 and directed through a focussing lens 16 to form an image on the photocathode 3.

Figure 2A:
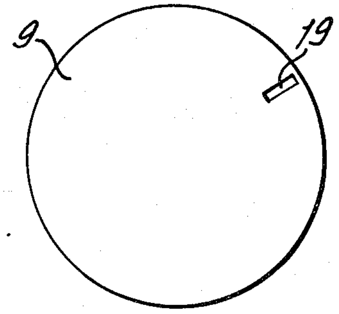
FIG. 2*a* is an end view of the disc of FIG. 1.

In contrast to the image tube of my aforesaid patent however the phosphor screen beyond the deflector electrodes 7*a*, 7*b* is removed and replaced by a stationary flat disc 9 which has an aperture 19 (FIG. 2*a*) therethrough. The aperture 19 is here shown as being of constant width radially of the disc 9, and it should be appreciated that it is shown in FIG. 2*a* on a greatly enlarged scale, for example in practice being of the order of $\mu$m in width.

The two pairs of deflector electrodes 7*a* and 7*b* are mounted to create two deflecting electric fields at right-angles to each other, with the phase control device 15 connected to the pairs of deflector electrodes 7*a* and 7*b*. By controlling the phase of the voltages applied to the electrodes 7*a* and 7*b*, a continuous circular or spiral deflection path is produced on the disc 9. The aperture in the disc 9 may be shaped to match the field of focussing of the image tube and this permits the achievement of a finer point image to increase the time resolution.

In this mode of working the rate of circular scan is adjusted to be equal to, or a multiple or sub-multiple of, the repetition rate of the light pulses in the pulse train from the continuous working mode-locked laser 18 or other source of repetitive light pulses. Should the photoelectron image of each light pulse not coincide with the aperture 19 of the disc 9, then the pulses can be delayed by using an optical delay line such as is shown in FIG. 3, consisting of two mirrors 20 and 21 to replace the single mirror 17 of FIG. 1. By fine adjustment of the position of one of these mirrors 20, 21, such as by employing a micrometer driven optical mount, the time of arrival of the light pulses at the photocathode 3 of the image tube can be adjusted to produce a photoelectron image at the disc 9 exactly coincident with the fixed aperture 19 in the disc 9. A maximum transmission of photo-electrons through the aperture 19 is thus obtained and these photo-electrons are collected and multiplied by an electron-multiplier 11 mounted inside the image tube 2 or on the end wall of the image tube. The resulting electrical signal, amplified if necessary by an amplifier 12, is recorded by a recorder 13, for example a pen recorder or oscilloscope.

By changing by a known amount the delay in the optical delay line, which may comprise mirrors or some other equivalent means, the average intensity of the laser pulses will be plotted out with a time resolution depending on the width of the aperture 19, the rate of circular scan set for the image tube, and the size of the photoelectron image at the disc 9. For a scanning speed on the disc 9 of $3 \times 10^{10}$ cm $sec^{-1}$ and an aperture width and photoelectron image width both of 50 $\mu$m, a time resolution of the order of $10^{-13}$ secs can be achieved. The time-resolution does not depend upon grain or other limitations found in image tubes employing phosphor screens.

As an alternative to delaying the light pulses to scan the pulse intensity envelope the relative phases of the deflecting voltages could be changed continuously by an appropriate phase control device 15 to effectively scan the photoelectron image across the sampling aperture 19.

Figure 2B:
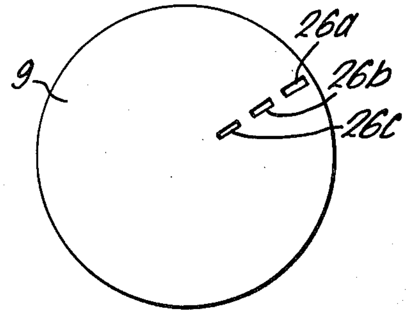
FIG. 2*b* is an end view of an alternative form of disc.
Figure 2C:
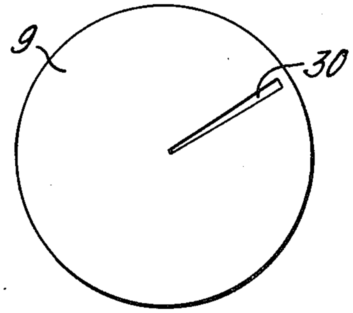
FIG. 2*c* is an end view of a further alternative form of disc.

By having an array of such apertures 26*a*, 26*b*, 26*c*, etc. of different widths and displaced along a radius of the disc 9, as shown in FIG. 2*b*, different time resolutions could be obtained by changing the radius of the scanning circle on the disc 9. Alternatively, a slit aperture of varying width such as is shown at 30 in FIG. 2*c* could be provided along a radius or a diameter of the disc to provide a continuously variable time resolution.

Although the invention has been described above in connection with measurement in the picosecond range, where it is particularly valuable, it is not to be considered as being limited to this or any other operating range of measurement. The technique, in accordance with the invention, of using an apertured plate which is scanned by the photoelectron image is of wide application to image tubes of many different forms and is not limited to the type of image tube described in my aforesaid patent.

I claim:

1. An electron-optical image tube system comprising a photocathode for receiving light images and converting them to photoelectrons, an extraction electrode at the emission side of the photocathode that generates a strong electric field and accelerates the photoelectrons away from the photocathode and projects these photoelectrons into a path on the output side of the extraction electrode at increased velocity, deflection electrode means on the path of the photoelectrons beyond the extraction electrode, means defining an aperture beyond said deflection electrode means on which photoelectrons received directly from the extraction electrode impinge, control means operable to scan the photoelectron image across the aperture, and pick-up means on the side of the aperture remote from the electrodes to receive photoelectrons passing through the aperture, a source of ultra-short light pulses, means providing an image of said pulses at the photocathode, voltage generating means connected to said deflection electrode means and providing voltages thereto, phase control means controlling the phase of the voltages applied to said deflection electrode means to produce a circular or spiral deflection path on said means defining said aperture, and adjustable optical delay means in the path of the light pulses to the photocathode.

2. An image tube system as claimed in claim 1, in which the optical delay means comprises a mirror system which is adjustable to vary the length of the path travelled by the pulses between the source and the photocathode.

* * * * *